United States Patent [19]

Davinson

[11] Patent Number: 4,765,742

[45] Date of Patent: Aug. 23, 1988

[54] OPTICAL MONITORING METHOD AND APPARATUS

[75] Inventor: Ian Davinson, Derby, England

[73] Assignee: Rolls-Royce plc, London, England

[21] Appl. No.: 883,949

[22] Filed: Jul. 10, 1986

[30] Foreign Application Priority Data

Jul. 24, 1985 [GB] United Kingdom ............... 8518709

[51] Int. Cl.$^4$ ............................................. G01B 11/14
[52] U.S. Cl. ............................... 356/373; 356/375; 250/227
[58] Field of Search ................ 356/373, 375, 376; 250/227

[56] References Cited

U.S. PATENT DOCUMENTS

| | | | |
|---|---|---|---|
| 4,356,395 | 10/1980 | Miller | 250/227 |
| 4,432,599 | 2/1984 | McMahon | 250/227 |
| 4,493,995 | 1/1985 | Adolfsson et al. | 250/227 |
| 4,666,304 | 5/1987 | Davies | 356/375 |

FOREIGN PATENT DOCUMENTS

0082045 11/1982 European Pat. Off. .

Primary Examiner—R. A. Rosenberger
Assistant Examiner—Crystal Cooper
Attorney, Agent, or Firm—Cushman, Darby & Cushman

[57] ABSTRACT

Monitor signals are produced which are qualitative or quantitative measures of the shape, size or position of a light spot on an optical head relative to fibre-optic receptors in the optical head. One pair or two pairs of receptors may be used. Production of the monitor signals involves modulating the incident light forming the light spot at a predetermined frequency, delaying the light signals in one or more of the fibre-optic receptors relative to the light signals in one or more of the other receptors by, say half a wavelength of the predetermined frequency, combining the outputs of the fibre-optic receptors to produce a compound light signal, producing an equivalent compound electrical signal by means of a photodiode, and processing the compound electrical signal in electronic processors to extract one or more of its components to act as the monitor signals. Use of the invention is particularly in the monitoring of relative displacements involving optical systems which image a light source on one object onto an optical head on another object, thereby forming the light spot whose shape, size, or position alters according to the relative displacement between the two objects and the type of optical system used.

25 Claims, 8 Drawing Sheets

Fig. 4.    DOTTED LINES ......... FIBRE OPTICS

OPTICAL MONITORING METHOD AND APPARATUS

The present invention relates to the monitoring of geometrical or positional characteristics of light spots such as are produced by optical systems used to monitor displacements, for example, variations in the relative positions of two objects.

In the field of gas turbine engine design and operation it is particularly desirable to monitor accurately the clearances between the tips of turbine or compressor rotor blades and their surrounding casings, because excessive clearances lower engine efficiency, whilst contact between blades and casing causes damage. Such monitoring has become important as a research and development tool in the gas turbine industry and suitable monitoring devices can also be used as components in active clearance control systems of various known types in order to provide a feedback control signal for maintaining the clearance at an optimum value under all operating conditions.

There is of course a need for monitoring displacements in many other areas of technology for purposes of measurement and control. In these areas, and in the gas turbine field, a number of proposals exist which enable monitoring of displacements to be performed utilising devices which project a beam of light at an object whose distance from the device is to be monitored. Light scattered back from the object is then focussed as a light spot onto a sensor surface and the shape, size or deflection of the light spot is monitored utilising a plurality of photodiodes or a photodiode array. The signals from the photodiodes are then processed to produce a monitor signal which when calibrated can be used as a measure of the displacement.

For some purposes—for example, a feedback signal to a servo system—a "qualitative" rather than a "quantitative" determination of displacements is sufficient, i.e. it is sufficient to produce a signal which gives a clear indication of whether, say, a clearance is at its ideal value or not, plus the sense of any variation from the ideal clearance, but which is not required to maintain an initial calibration of the monitoring/servo system combination in terms of the exact value of the clearance. On the other hand, quantitative determination of displacement is necessary for some purposes, such as exact measurement of clearances, and this often requires that the signal finally produced from the output of the monitoring device be ratioed with its input to minimise the consequences of variations in illuminance in order to maintain the validity of the original calibration of the monitoring/servosystem combination within acceptable limits.

One object of the present invention is therefore to provide a means of monitoring displacements optically which can provide an output signal capable of being easily processed to extract qualitative and/or quantitative information concerning the displacements.

In some environments, low light levels are a problem. Thus, in gas turbine engines, lens apertures in the projection/imaging system are minimised in order to get it into as small an aperture as possible in the casing of the turbine or compressor under investigation. This fact, plus low reflectivity of the blade tips whose clearance is being monitored, and the probability of lens contamination in the engine environment, leads to quite low light fluxes in the optics and resulting low photo-electrical signal levels. The characteristics of photodiodes, for example, are such that at low photocurrent levels their outputs fluctuate more widely as percentages of themselves than at high photocurrent levels, i.e. at low illumination levels their outputs are "noisy". Moreover, in some cases an avalanche photodiode detector or photomultiplier may be required to cope with the low light levels, but such detectors are prone to gain variations over the longer term, and therefore can sometimes produce output signals which are not reliable indications of the true illumination.

Such output fluctuations at low light levels give rise to a problem with monitor signals involving terms derived by differencing the photodiode outputs, in that if the outputs are of similar magnitude, the value of a difference term will show large fluctuations as a percentage of itself for relatively small fluctuations of the outputs as percentages of themselves. Therefore the accuracy of the monitor signal suffers.

The present invention contributes to overcoming the above problems by modifying the way in which the monitor signal is derived from the light flux values in the optical system.

Accordingly, the present invention provides a method of monitoring a geometrical or positional characteristic of a light spot relative to at least first and second light receptor means arranged in a fixed relationship to each other, the light spot being formed by light incident on the receptor means which produces light signals in each receptor means, the magnitude of the light signals in each receptor means being dependent upon said light spot characteristic, the method comprising:

(a) modulating the incident light at a predetermined frequency;
(b) delaying the light signal in the second receptor means relative to the light signals in the first receptor means by a predetermined fraction of a cycle of the predetermined frequency;
(c) combining the outputs of the first and second receptor means to produce a compound light signal having an amplitude at the predetermined frequency which is dependent upon the magnitude of the difference between the light signals in the first and second receptor means; and
(d) deriving from the compound light signal a monitor signal representative of the amplitude of the compound light signal at the predetermined frequency and hence of said difference between the amplitudes of the light signals in the first and second receptor means, whereby said monitor signal is expressive of said light spot characteristic.

This method has the advantage over the prior arrangements that difference terms, expressive of, e.g., light spot shape or position, are in effect produced optically rather than by combining photodiode outputs, subsequent signal processing serving only to separate out the difference component in the compound light signal. Therefore, the problem of magnification of photocurrent fluctuations during derivation of the difference term from photodiode outputs is significantly reduced.

A further allied advantage is that the invention enables the use of only one photodiode as a transducer to produce an electrical signal equivalent to the compound light signal. Since the compound light signal is stronger than the light signals from the individual receptors, the resulting photocurrents are larger than in the prior art, so that minor fluctuations of the photocurrent have a less serious effect. Use of a single photodiode avoids the problems of relative instability between different photodiode outputs and also saves expense and simplifies the apparatus as a whole.

If it is desired to produce a monitor signal maximally useful for quantative determination of displacements, it is preferred that the above method comprises the additional steps of:

(a) deriving from the compound light signal an addition signal representative of the total light flux falling on the light receptor means; and (b) normalising the or each monitor signal by obtaining its ratio with the addition signal.

The delay step in the above method produces an out-of-phase relationship between components of the compound light signal and this enables easy electronic processing of the compound light signal after it has been transmitted to a photoelectric transducer element which produces an equivalent compound electrical signal. For example, the light flux from one of the light receptor means may be delayed in transmission relative to the light flux from the other one by half a wavelength of the predetermined frequency, the monitor signal then being produced by inputting the compound electrical signal to a phase-sensitive detector or the like synchronised to the predetermined frequency.

Other aspects of the present invention will be apparent from a perusal of the following specification and claims.

Embodiments of the invention will now be described, by way of example only, with reference to the accompanying drawings, in which.

Figure 1A:
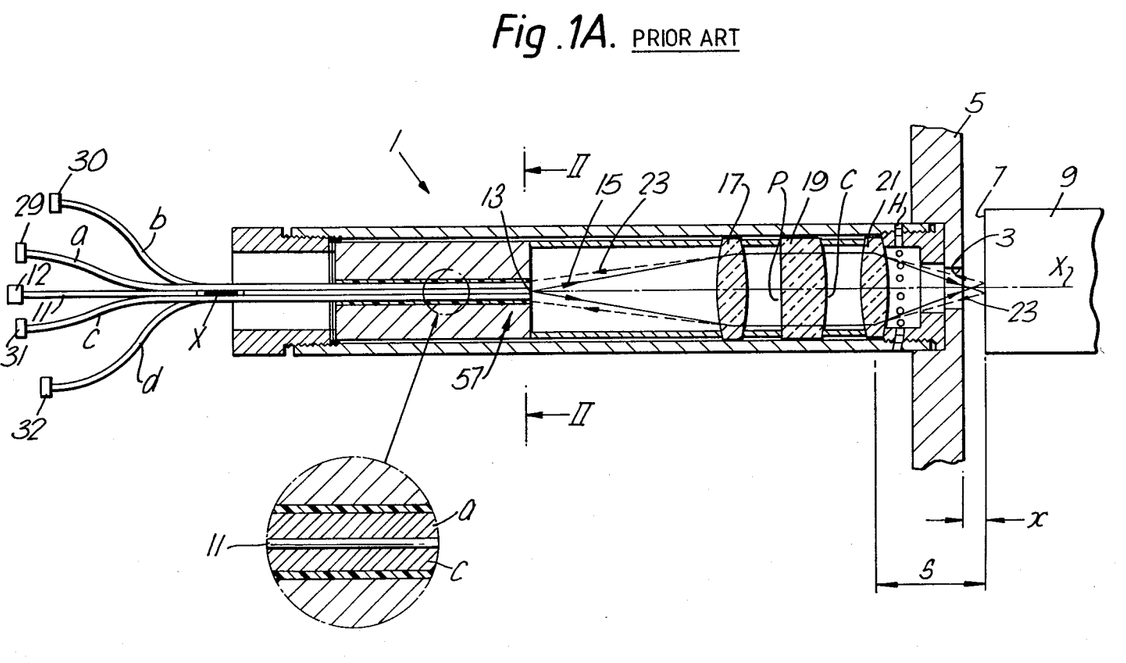
FIG. 1A is an edited reproduction of FIG. 1 of prior patent number GB2066449B and U.S. Pat. No. 4,357,104, showing diagramatically the layout and components of an optical probe with which the present invention can be used.

Referring first to FIG. 1, there is shown a known optical probe 1, which is accurately locatable against an aperture 3 in the turbine casing 5 of a gas turbine engine in order to monitor the clearance x between the tip 7 of the turbine blade 9 and the turbine casing 5 which for simplicity is shown as just a single wall thickness.

The probe 1 works on the principle that a light beam which is focussed by an astigmatic lens system changes shape as it passes through the focus. A solid object, such as the tip 7 of turbine blade 9 placed near the focus, has a spot of light projected onto it, the shape of the spot depending on the exact distance S of the object from the objective end of the lens system, which is taken to define a datum from which S is measured. If a detector is then incorporated which produces an output dependent on spot shape, this output will then provide a measure of the distance S, and hence of clearance x.

In probe 1, the end 13 of a single optical fibre 11 acts as a primary light source. Fibre optic 11 has light from a suitable projector lamp, light emitting diode, or laser diode 12 fed into its other end distant from the probe 1. Light 15 emitted from the end 13 of fibre optic 11 is collimated by a lens 17, astigmatism is introduced by weak cylindrical lens 19, and an astigmatic image of the end 13 of fibre optic 11 is projected onto the blade tips by convex lens 21.

The weak cylindrical lens 19 has a plane face P and a cylindrically convex face C whose longitudinal axis is perpendicular to the plane of the paper. The focal length of the lens system 17,19,21 in the plane of the paper is therefore different from its focal length in a plane perpendicular to the plane of the paper. In fact, the focal length in the plane perpendicular to the plane of the paper is shorter, the focal length in the plane of the paper being almost unaffected by lens 19 because in this plane it is effectively a plane sheet of glass.

As an object, such as the blade tip 7, is moved in towards the probe 1 from the first focal position, corresponding to the long focal length, to the second focal position, corresponding to the shorter focal length, the image which the lens system projects on to it will change in shape respectively from a line in the plane of the paper to a line in a plane perpendicular to the plane of the paper. At a position between the two focal positions, the image of the source 13 will be equally out of focus in both planes and here the image will be circular. It is arranged that this latter position corresponds to the optimum clearance x. A suitable size for this circular spot of light is 0.25–0.5 mm. For comparison, the thickness of a blade tip may be 1 mm–1 cm.

The image on the blade tip can itself be regarded as a source of light, and the lens system 17,19,21 allows projection of image light 23 (dashed direction lines) back through the system on to the light source 13 and the area surrounding it. Since additional astigmatism is introduced into the image as it is re-projected back through the lens system, the line-circle transformation still occurs around source 13, but with the effect increased by an amount depending on the ratio of the focal lengths of lenses 17 and 21.

Figure 2:
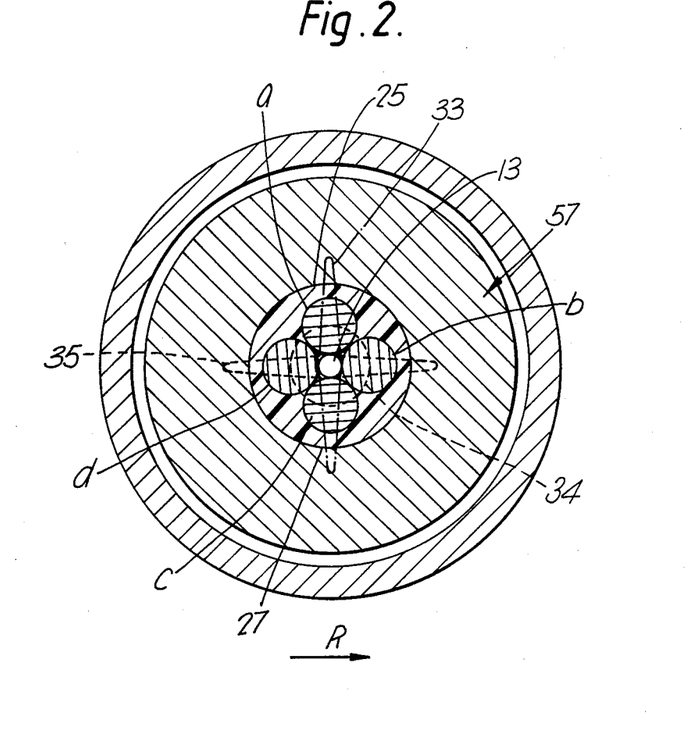
FIG. 2 is an enlarged view on the section II—II in FIG. 1.

In order to detect the change of shape of the light spot with change in distance x, the light flux falls on the ends of each of four light receptors comprising optical fibres or fibre bundles a,b,c, and d, whose ends are equiangularly spaced immediately around the light emitting end 13 of source fibre 11 (see FIG. 2). Photodiodes 29-32 receive light signals from the four fibre-optics and produce electrical signals for further processing. As shown in FIGS. 1 and 2, the image shape detector formed by fibre-optics a,b,c and d, the light source fibre 11, are both incorporated in a composite optical head component 57.

Mounting of laser diode 12 remote from the probe body and use of the fibreoptic 11 to inject the light is of course desirable due to the effects of heat and vibration in the immediate environment of the gas turbine, but it would also be possible to mount a laser diode directly in the optical head 57 if this was desirable for some reason.

For further details of the construction of the optical probe and its components, the prior patent specifications already mentioned should be consulted. However, in addition it should be noted that use of the probe in the hot environment of a turbine would of course in practice require the probe to be provided with a coupling air jacket as known in the art of radiation pyrometry and indicated in FIG. 4 at J. Some of this air would be used as purge air to protect lens 21 from contamination by combustion products, the purge air being injected into the chamber in front of lens 21 through holes H and exhausting into the turbine passage.

It should be understood that various changes could be made in the optical layout of optical probe 1 described above without affecting the essentials of the working of the invention as subsequently described hereafter. For example, the single cylindrical lens 19 could be replaced by a pair of crossed cylindrical lenses. Furthermore, whilst the incorporation of the light emitting and receiving fibre-optics in a unitary optical head 57 enables a particularly compact probe to be constructed, since all its optical components share a common optical axis, it would be possible to inject the light 15 otherwise than through emitter fibre 11 or an equivalently located laser diode. For example, referring to FIG. 1B, light 15' could be injected at right angles to the main optical axis X' of the probe from a suitable light source 12' located to one side of the axis X', the light 15' being collimated by lens 70 and directed along axis x' by means of a beam splitter 72, the rest of the lens arrangement of the probe remaining the same as shown in FIG. 1A. It would of course also be possible to incorporate the cylindrical lens or lenses between the lens 70 and beam splitter 72 instead of between lenses 17 and 21 as shown, but in this case the advantage of the additional astigmatism, introduced by lens 19' into the light 23 returned from the object 9, would be lost.

Figure 1B:
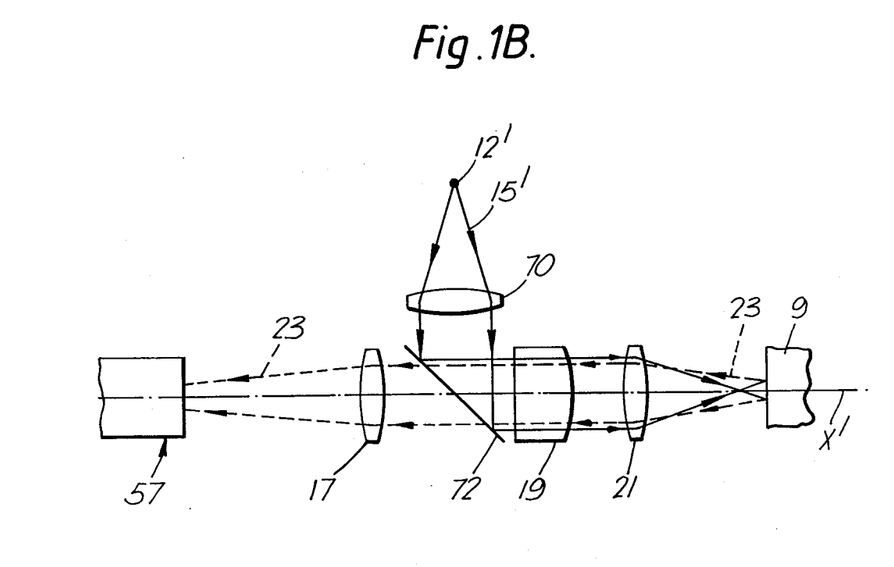
FIG. 1B is a diagram illustrating an alternative optical layout for the optical probe.

Returning now to a consideration of the functioning of the optical head 57 in FIGS. 1A and 1B, the three basic modes in which image light 23 falls on the fibre optics a to d (and hence on the photodiodes 29-32 to which they are connected) are illustrated in FIG. 2 by reference numbers 33, 34 and 35. The probe 1 is oriented with respect to the casing aperture 3 (FIG. 1) so that when the distance S, and hence clearance x, is large, the elongated spot of light 33 (chain-dotted shape) is produced as the blade tip 7 passes optical axis X—X. Spot 33 falls mainly on the light-receiving ends of fibre optics a and c, producing relatively large photocurrents in cells 29 and 31, but only small photocurrents in cells 32 and 30.

When clearance x is at its nominally optimum value, a circular spot of light 34 (dashed circle) is produced and falls equally on all the quadrants, producing momentarily equal photocurrents in all four cells. When the clearance is small, the elongated spot of light 35 (dotted shape) thereby produced falls mainly on quadrants b and d, producing relatively large photocurrents in cells 30 and 32, but only small photocurrents in cells 29 and 31.

If the quadrant reference letters a to c are taken to represent the amount of light which each of them receives, they can also be taken to represent the output voltage of corresponding cells 29 to 32, since these are proportional to the light fluxes incident upon them. It is required to produce a clearance monitor signal whose magnitude is a measure of the shape of the light spot. Such a monitor signal can be obtained if the photo-cell output voltages are combined in the ration $$\frac{(a + c) - (b + d)}{(a + c) + (b + d)}$$

which for convenience may be expressed as $$\frac{A - B}{A + B}$$

Figure 3:
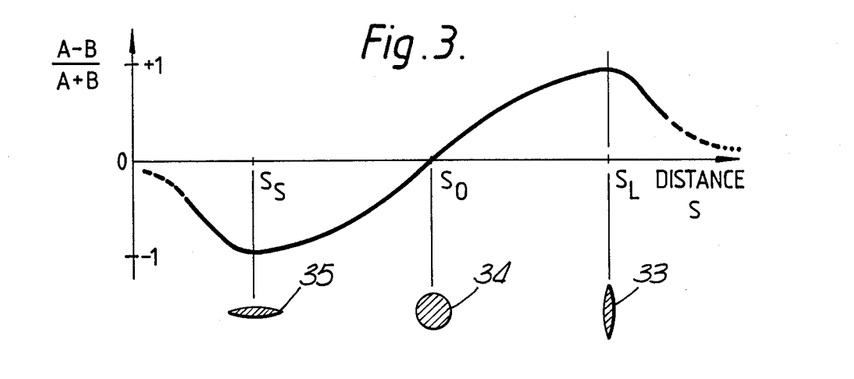
FIG. 3 is a graphical representation of a monitor signal it is desired to derive from the probe as plotted against a distance being measured by the probe.

FIG. 3 shows how the value of $(A-B)/(A+B)$ varies with distance S. When the blade tip is at the long focal position $S_l$ of the probe 1, with spot 33 falling mainly on fibre-optics a and c, then by inspection $(A-B)/(A+B)$ will approach the value +1. At the short focal position $S_s$, with spot 35 falling mainly on fibre-optics b and d, $(A-B)/(A+B)$ will approach the value $-1$. At the mean focal position $S_o$, with spot 34 falling equally on fibre-optics a,b,c, and d, $(A-B)/(A+B)$ will be zero (optimum clearance).

The production of such a signal is subject to the problems explained previously, and how the present invention contributes to their solution will now be described with particular reference to FIGS. 4 and 5.

Figure 4:
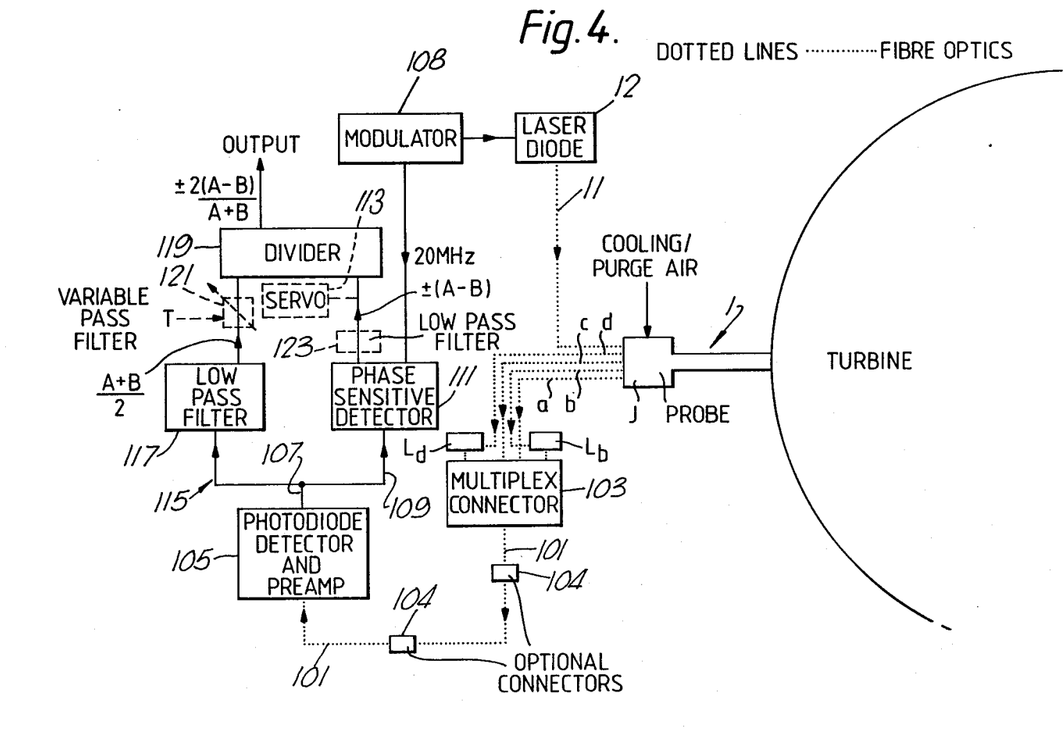
FIG. 4 is a schematic representation of a system incorporating apparatus according to the invention.

Referring to FIG. 4, the fibre optic channels a,b,c and d indicated by dotted lines are not used to feed corresponding individual photodiodes as for FIG. 1; instead they feed their light fluxes into a single fibre optic cable 101 by means of a multiple input optical connector 103 to produce a combined optical signal which is turn is fed through optical connectors 104 to a single photodiode detector and preamplifier 105. Fibre optic cable 101 may be made sufficiently long to enable the detector/preamplifier 105 module to be situated in a suitably benign location on the gas turbine engine being monitored, or on other structure in the test cell or the aircraft. Alternatively, it would be possible to connect the ends of fibre-optics a,b,c and d to the detector/preamplifier 105 through a multiplex input optical connector like connector 103. This would again combine the light signals from the fibre-optics to give a combined optical signal input to the photodiode.

Having combined light from fibre optics a,b,c and d into a single optical channel photodiode input 101 with a corresponding compound electrical signal output 107 from photodiode/preamplifier 105, it is apparent that in order to obtain the desired signals $A-B$ or $(A-B)/(A+B)$ from the output 107 it is necessary to provide some means of differentiating between the light signals a+c and b+d, which are otherwise indistinguishable from each other in the single optical channel. To enable this it is arranged that the laser diode light source 12 which feeds into the optical emitter fibre 11 of the probe (see also FIG. 1) is modulated (e.g. switched on and off) at a high frequency (say 20 MHz) by control circuitry 108, and that the signals in one pair of the receptor fibre-optics, for example, b and d, are delayed relative to the signals in the other pair by means of delay lines $L_b$, $L_d$ which make fibre-optics b and d longer than the other pair by an amount which ensures that light signals b and d arrive at the multiplex connector 103 one-half cycle of the 20 MHz modulatory frequency out of phase with the light signals a and c. The result is that the combined light signal is in fact a compound light signal. Consequently the output of the photodiode/preamplifier 105 is a compound electrical signal whose amplitude at a frequency of 20 MHz will represent the value $A-B$ whenever a blade tip passes the optical axis X—X of the probe 1 (FIG. 1).

Figure 5:
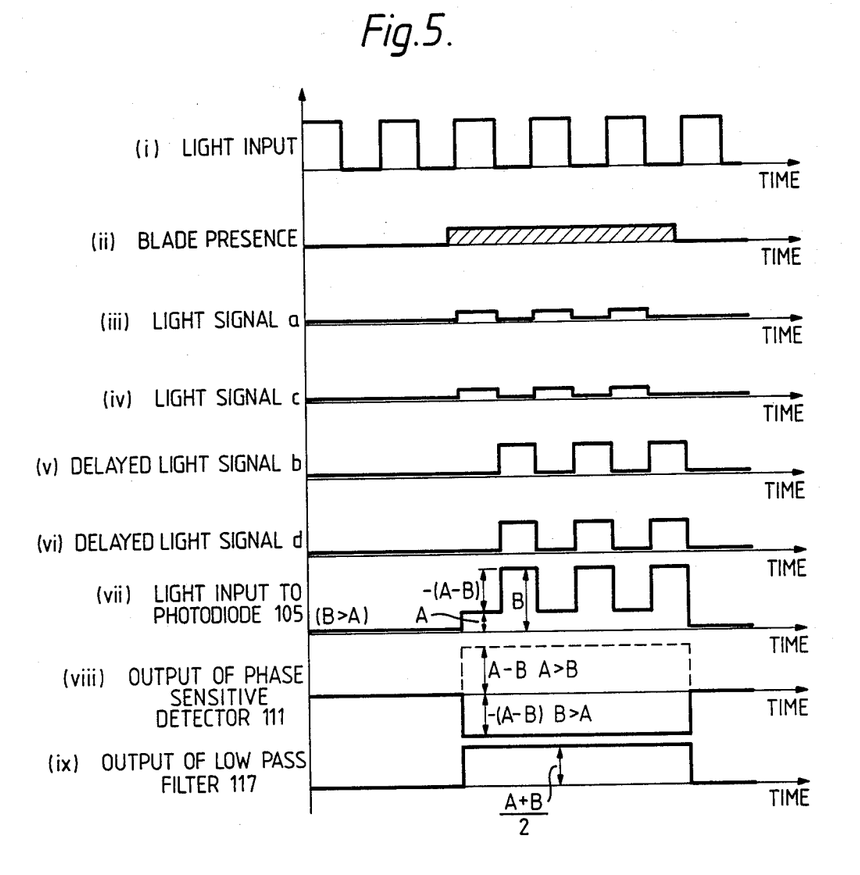
FIG. 5 is a graphical representation of signals at various stages of processing in the apparatus of FIG. 4.

This situation is represented graphically in FIG. 5. In FIG. 5(*i*) we see the modulated light input to the input optical fibre 11, plotted as intensity against time and appearing as a square wave. The input light signal is only reflected from the blade tips and back onto receptor fibre optics a,b,c and d when a blade tip is present in the probe's optical path, and the passage of a blade past the probe is represented in FIG. 5(*ii*), where it will be noticed that the presence of a blade tip in the optical path of the probe coincides with several of the 20 MHz light input pulses of FIG. 5(*i*). Hence, the light pulses intercepted by the blades will be transmitted to the fibre optics a,b,c and d. The amount of light received by each fibre as a blade passes depends on the state of focus of the astigmatic image on the blade tip.

One possibility is shown in FIGS. 5(*iii*) to 5(*vi*), where the plot of light intensity against the common time base for each fibre optic as a blade tip passes the probe is shown for the situation when the blade tip is at a small clearance and consequently the light spot falling on the fibre optics is the elongate shape 35 (FIG. 2). In this case the light levels in fibre optics a and c are nominally equal and low but in fibre optics b and d they are nominally equal and high. As shown in FIGS. 5(*v*) and 5(*vi*), by the time the light signals reach the ends of longer fibre optics b and d they are delayed by half a cycle (i.e. half a wavelength) of the 20 MHz modulating frequency relative to the light signals at the ends of shorter fibre optics a and c. The light signals from all four of the fibre optics are summed in connector 103 and fibre optic cable 101 (FIG. 4) and hence the compound light signal input to the detector is as shown in FIG. 5(*vii*), with A and B components which are out of phase by 180°. Because of this phase difference and the fact that the light spot 35 (FIG. 2) is falling mainly on the fibre-optics b and d so that B is larger than A, the amplitude of the compound light signal at the 20 MHz modulating frequency is $B-A$, i.e. $-(A-B)$, this being the third component of the compound light signal and hence also of the compound electrical signal output of photodiode 105.

It will now be seen that at the optimum clearance, when the light spot is circular (34 in FIG. 2), the light signals a,b,c and d would all be of equal value and no output at 20 MHz would be obtained from photodetector/preamplifier 105. As either A or B increases, a 20 MHz signal would be obtained, the phase of which would indicate which one of A or B had increased, and hence whether the clearance had increased or decreased.

In order to isolate the $A-B$ component the output 107 of photo-diode/preamplifier 105 is passed through the first branch 109 of an electronic analogue signal processor. This branch consists primarily of a synchronous demodulator or phase-sensitive detector 111 which is linked to modulator 108 to enable synchronisation to the 20 MHz modulatory frequency. The output of the phase-sensitive detector 111 can be regarded as a monitor of the shape of the lightspot and hence of the clearance and is as shown in FIG. 5 (*viii*), namely a recurrent difference signal of value $-(A-B)$ if $B>A$, or $A-B$ if $A>B$, the recurrence being at blade passing frequency. Clearly, if $A=B$, which is the case at optimum clearance, there will be no signal out of the phase-sensitive detector.

The $A-B$ monitor signal output from the phase sensitive detector 111 can be used as a feedback signal for a servosystem 113 capable of adjusting the turbine blade clearance in any one of several known ways, which do not form part of the present invention. In such a case the optical probe shown in FIG. 1 merely acts as a null sensor, signalling deviation from the ideal clearance between blade tip and engine casing. Unless the servo 113 effectively incorporates a low pass filter within itself it is necessary to incorporate a low pass filter 123 between the phase-sensitive detector 111 and the servo 113.

If actual values of displacement of the turbine blade tip from the null point are required in order to evaluate clearances exactly, than an $A+B$ addition signal is also required in order to normalise the monitor signal output of the phase sensitive detector 111, the object of such normalisation being to remove the effect on the signal of such things as light source intensity variations, lens contamination, and variations in blade reflectivity. Normalisation is achieved by making the output signal from the signal processor the ratio $(A-B)/(A+B)$, and $A+B$ term being the result of addition of the amplitudes of the two quantities A and B irrespective of phase difference, this effectively being achieved in the second branch 115 of the processor, in which a low band-pass filter 117 receives the amplified photodiode signal 107 and gives an output signal $(A+B)/2$ as indicated in FIG. 5(*ix*). This is ratioed with the $A-B$ monitor signal from the other branch of the processor in a divider 119 to give the processor an output signal of the form $2(A-B)/(A+B)$. The factor 2 and any other constants of the system are of course compensated for by initial calibration of the complete system when it is installed.

The above is a description of two simple variations of a system for electronically processing the compound electrical signal and many refinements will be apparent to the specialist.

For example, the discussion above leaves out of consideration the effect of glare in the optical system due to unwanted reflections and refractions. The glare component of the signal from photodiode/preamplifier 105 is in fact cancelled in the $A-B$ term of branch 109 of the processor, but is still present in the $(A+B)/2$ output of low pass filter 117. If the glare component were a significant fraction of the $(A+B)/2$ term it would need to be compensated for and in fact it could easily be removed if necessary by passing the output of low pass filter 117 through a further filter 121 (dashed lines) adapted to remove glare by passing on only the signal components at the blade passing frequency. This would of course need to be a tracking band-pass filter controlled by a rotational speed signal T derived from a tachometer on the engine.

Another complication arises from the fact that there may be fluctuations in signal strength superimposed upon the output signal from detector/preamplifier 107, these fluctuations being caused by variations in surface texture of the parts of the blade tips being scanned by the probe. Such fluctuations, although rapid, should have a frequency much less than 20 MHz and will therefore be smoothed by low pass filtering. Consequently, the output from branch 115 of the electronic processor is corrected in this respect due to the presence of low pass filter 117, but branch 109 could require the addition of a low pass filter 123 after the phase-sensitive detector 111 in order to smooth the signal, assuming it is not already incorporated to aid servo 113.

Note that it is assumed above that the phase sensitive detector 111 would in any case incorporate a low pass filter on its output which would be effective to filter out the 20 MHz modulation, but it would probably not be effective to filter out the lower frequency fluctuations due to surface texture.

Although the invention has so far been described in relation to its applicability to the monitoring of variations in distances, it is also useful for monitoring other types of displacement. For example, a modulated light source and an optical head light the optical head 57 in FIGS. 1A and 1B could be incorporated in surveying instruments, together with appropriate delay lines, for obtaining levels, elevations and triangulations. An interesting example of this sort of use is in guiding a tunnelling machine, and this will now be described, with reference to FIG. 6.

Figure 6:
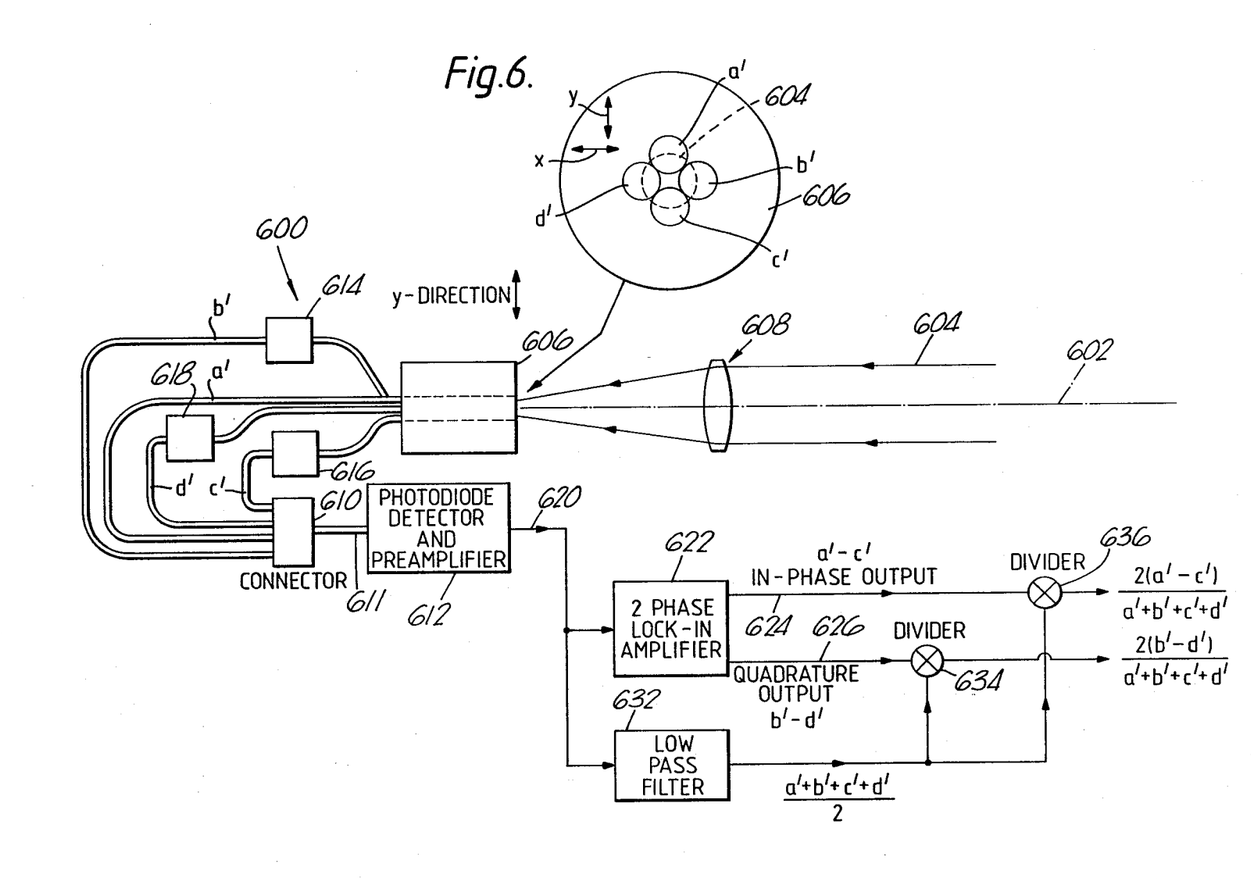
FIG. 6 is a schematic representation of an alternative form of the invention.

The requirement is for an optical device 600 which will sense the deviation of the tunnelling machine (not shown) from a required normal straight light path 602, the latter being conveniently defined by a laser beam 604. The laser beam is modulated at a high frequency and is projected from a properly surveyed base (not shown) down the tunnel to the optical device 600, which is mounted on the rear of the tunnelling machine. It is necessary to monitor both vertical (y) and horizontal (x) deviations from the ideal path 602 and therefore the optical device has an optical head 606 similar to optical head 57 in FIGS. 1 and 2, except that of course it does not incorporate the light source. It thus consists of four light receptor fibres or fibre-bundles a',b',c', and d' onto which the laser beam is focussed by an appropriate optical system represented by lens 608. The inset to FIG. 6 shows an end view of the optical head 606 with the laser beam 604 falling as a light spot onto the receptor ends of the fibre-optics a',b',c' and d'.

When the tunnelling machine is in the correct position relative to the laser beam 604, the laser beam illuminates all four light receptor fibre-optics equally as shown in the inset. These carry the intercepted light fluxes to a multiplex fibre-optic connector 610, where the light inputs are combined and piped through single fibre-optic 611 to a single photodiode detector and preamplifier 612, as was the case of FIG. 4.

In order to provide the device with the ability to sense positive and negative deviations with respect to the x and y axes, the fibre optics b',c' and d' incorporate delay lines 614,616 and 618 respectively. In this way the lengths of fibre optics b',c' and d' are made greater than a' by one-quarter, one-half and three quarters of a wavelength, respectively, of the modulating frequency. Assuming equal illumination of all the four fibre-optics by the laser beam and a 50% duty cycle for the modulation of the laser beam, the result is that the light inputs a',b',c' and d' add up in multiplex connector 610 to a constant light flux input to the photodiode: changes in light flux input indicate that the tunnelling machine is going off course and are processed as follows.

The output 620 of the detector/preamplifier 612 is fed to the equivalent of a phase-sensitive detector in the form of a two-phase lock-in amplifier 622 which is synchronised at S to the modulation frequency and has two outputs 624 and 626 which respectively indicate the amounts of in-phase and quadrature signals present in the compound signal on line 620. The in-phase output 624 of the amplifier 622 can be used as a first monitor signal and represents the value a'−c' and the quadrature output can be used as a second monitor signal and represents b'−d', consequently it will be seen that when nominal positioning of the tunnelling machine causes the amplitudes of a',c', b' and d' to be equal, the monitor signal outputs 624 and 626 will be zero.

If the tunnelling machine deviates horizontally, the light spot will move on the x axis so that, say, fibre-optic b' is illuminated more than d', whilst fibre-optics a' and c' will remain equally illuminated with respect to each other. Assuming that the reference signal S to the amplifier 622 is in-phase with the light signal a', then the quadrature output 626 of the amplifier 622 will have a signed magnitude proportional to b'−d', indicative of left or right horizontal deviation. Similarly, the in-phase output 624 of amplifier 622 indicates deviation in the vertical or y axis. If the deviation has components in both the x and y axes this will generate signals in both the quadrature and in-phase outputs which are proportional to the x and y components of the deviation.

From the above it will be seen that the outputs 624 and 626 can be used as a control signal input to the tunnelling machine to move it back to the nominal position.

It it is desired to obtain a quantitative measure of the deviations instead of merely a feedback signal for a control system, the output of the detector/preamplifier 612 must be put through a low pass filter 632 in parallel with the lock-in amplifier. This arrangements is like that of FIG. 4 and will give an output from the filter 632 which is proportional to the value $(a'+b'+c'+d')$, hence proportional to the mean intensity of the light spot. Thus the output of filter 632 can be used to normalise the quadrature and in-phase monitor signal outputs of amplifier 622 by means of dividers 634 and 636. It should be noted that although one lock-in amplifier currently commercially available is known to operate at 50 MHz, most are of low frequency capability, causing the delay lines to be very long.

Figure 7:
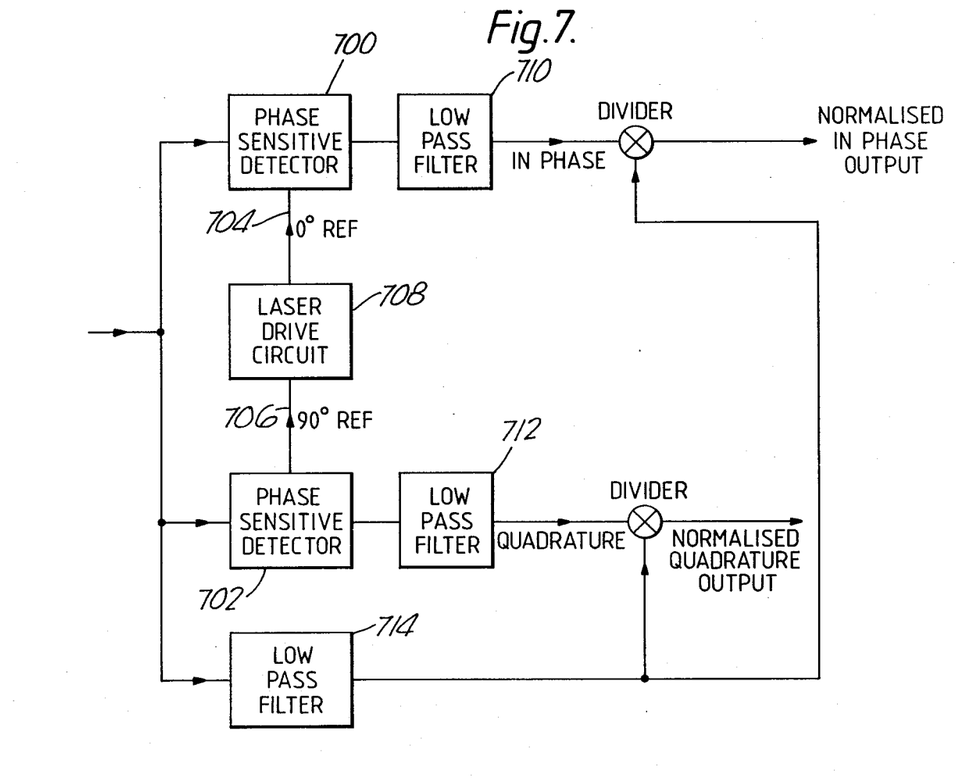
FIG. 7 is a block diagram showing a form of signal processing apparatus in accordance with the invention.

FIG. 7, shows one way of achieving the two-phase lock-in amplifier 622 of FIG. 6. Two single-phase phase sensitive detectors 700,702 are arranged in parallel with each other, both of them receiving synchronising signals 704,706 respectively from the laser drive circuitry 708 which modulates the laser beam at the required high frequency. The synchronising signal received by phase-sensitive detector 700 is in phase with the modulation of the laser beam, whilst that received by detector 702 is in quadrature to the modulation. Consequently, after passing through respective low pass-filters 710,712, the outputs of the detectors 700 and 702 are respectively the in-phase monitor signal a'−c' and the quadrature monitor signal b'−d'. These are normalised by dividing them by the output of the low pass filter 632 as in FIG. 6.

In order to obviate the need for a physical link between the laser and the device 600 to supply the synchronising signal(s) to the lock-in amplifier 622, the required in-phase and quadrature synchronising signals could be obtained by incorporating a further photodetector and preamplifier to monitor the modulation frequency of the laser beam by means of a receptor in the centre of the optical head. The modulated output of the further photodiode/preamplifier combination would be conditioned to give in-phase and quadrature synchronising signals which would be fed to the two-phase sensitive detectors 700,702.

A further embodiment, analogous to the FIG. 6 embodiment, can be envisaged for use in attitude control or guidance of a satellite or other spacecraft. Again, the device would comprise an optical system for focussing the image of the sun or a suitable star onto an optical head similar to the ones described above, and similar monitor/control signals could be derived. However the incoming light is not modulated in the desired way at source and therefore an optical chopper would have to be inserted in the optical system. This expedient would also be applicable to the FIG. 6 embodiment and would obviate the need to modulate the laser beam at source.

The above-mentioned embodiments of the invention have been concerned to monitor displacements either by two-dimensional variations in the position of a light spot or two-dimensional variations in its shape. However, displacements can also be monitored by utilising an optical system which produces only a one-dimensional variation in the position or shape of a light spot. An example of such an optical system is that one which is known generally as an optical triangulation system. In these a light source such as a laser diode is focussed as a light spot onto an object whose distance from the optical system is to be measured. The light is scattered back from the surface of the object and an image of the light spot is focussed onto a linear photodiode array or other semiconductor light spot position sensor. The arrangement of the optical elements of the system in such that as the distance between the object and the optical system alters, the position of the light spot changes on the sensor, the movement being along the longitudinal axis of the sensor. Examples of optical triangulation systems are the commercially available Selcon Optocator from Selective Electronics Inc., Valdese, N.C., USA, and the one described in Published European Patent Application No. 0119679A by the present applicant.

Figure 8:
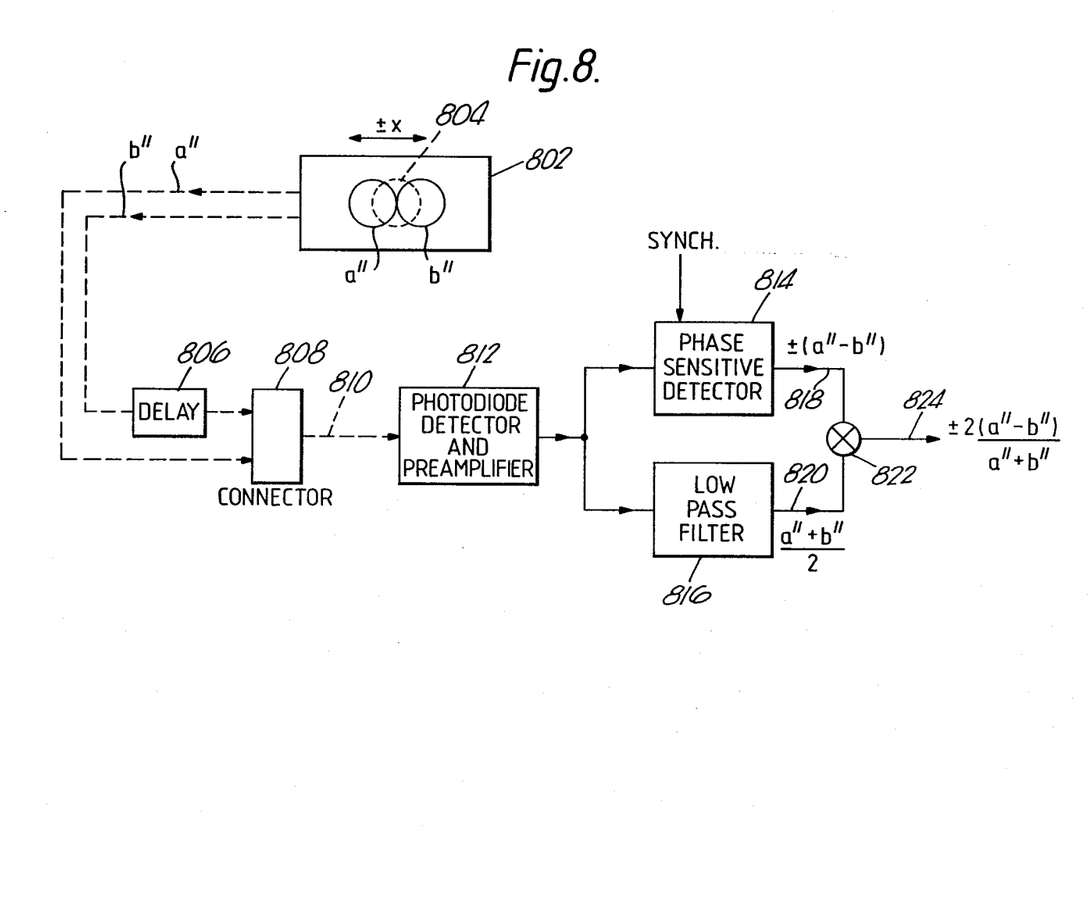
FIG. 8, is a schematic representation of a further alternative form of the invention.

In accordance with the present invention, it is proposed to replace the semiconductor sensors utilised in prior optical triangulation systems with a single pair of fibre-optics, held side-by-side in an optical head, and an associated optical delay line. The arrangement is as shown in FIG. 8, where twin fibre-optics a″ and b″ are held in a rectangular section optical head 802, shown in end elevation, and the light spot 804 (dashed circle) illuminates the receptor ends of the fibre-optics equally when the object whose distance is being measured is at a known median distance from the optical system (not shown). The fibre-optics emerging from the rear of the optical head 802 are shown in dashed lines. Light spot 804 moves in the x-direction according to whether the object is closer to, or further away from, the optical system than is the median position. The light beam which forms the light spot 804 is modulated as in previous embodiment. As shown diagrammatically in FIG. 8, the fibre-optic b″ is provided with a delay line 806 which lengthens fibre-optic b″ relative to fibre-optic a″ by an amount equal to one-half wavelength (i.e. half a cycle) of the modulating frequency. Thereafter the connector 808 combines the light signals by joining fibre-optics a″ and b″ to a single fibre-optic 810. The rest of the signal processing apparatus is the same as that shown in FIG. 4, with conversion to an electrical signal in photodiode/preamplifier 812, the production of a qualitative output (a″−b″) from a phase-sensitive detector 814, which gives a calibrateable output proportional to (a″−b″)/(a″+b″) when normalised with the output of a low pass filter 816.

This is perhaps the simplest embodiment of the invention, of which the other embodiments can be considered elaborations.

It should be noted that the above-proposed replacement of a linear photodiode array or other semiconductor sensor with a fibre-optic head and delay line, as shown in FIG. 8, is subject to certain restrictions connected with relative sizes of the light spot and the receptor ends of the fibre-optics. Thus, to avoid regions of reduced sensitivity and "dead zones", in which illumination of one or both of the receptor ends remains constant despite movement of the light spot, the diameter of the light spot should not be greater than the diameter of the receptor ends, whilst being at least as great as the amplitude of its expected movement.

It should further be noted that for detection of very low light levels, the detector photodiodes of FIGS. 4, 6, 7 and 8 could be replaced by avalanche photodiodes or photomultipliers which need not have high stability.

Whereas the above description with reference to the drawings has not mentioned the possibility of utilising light receptor fibres or fibre-bundles moulded to other than circular cross-section shape, it would be within the ambit of the invention to utilise other convenient shapes; for example, quadrants of circles in the case of an optical head like that shown in FIG. 2 or FIG. 6, or rectangular in the case of that shown in FIG. 8.

The optical arrangements discussed above have been concerned with relative displacements causing variation in the shape or position of a light spot relative to one or two pairs of light receptors. As the skilled worker will realise, it would be possible to utilise more than two pairs of light receptors if this were to be thought desirable for any reason, for example to detect changes of shape of a light spot which could not be guaranteed to change its dimensions alsong mutually perpendicular axes, or whose orientation with respect to the axes defined by the light receptors is not predetermined.

The invention is believed to be of particular benefit in apparatus for use in demanding environments, such as those associated with gas turbine aeroengines and satellites, in which it is difficult to maintain relative stability of the separate photo-detectors and amplifiers which would otherwise be needed to handle light signals from a plurality of optical channels; for use when very expensive photodetectors and amplifiers would otherwise be required; and for use in situations where very low light levels dictate the use of avalanche photodiodes or photomultipliers as photodetectors, since the invention avoids the need of an expensive high gain stability photomultiplier for each optical channel by enabling their substitution by one cheaper low stability photomultiplier.

I claim:

1. A method of monitoring a geometrical or positional characteristic of a light spot relative to at least first and second light receptor means arranged in a fixed relationship to each other, the light spot being formed by light incident on the receptor means which produces light signals in each receptor means, the magnitude of the light signals in each receptor means being dependent upon said light spot characteristic, the method comprising:
   (a) modulating the incident light at a predetermined frequency to give the incident light a duty cycle of substantially 50%;
   (b) delaying the light signals in the second receptor means relative to the light signals in the first receptor means by a predetermined fraction of a cycle of the predetermined frequency;
   (c) combining the outputs of the first and second receptor means to produce a compound light signal having an amplitude at the predetermined frequency which is dependent upon the magnitude of the difference in amplitudes between the light signals in the first and second receptor means; and (d) deriving an electrical monitor signal from the compound light signal using photoelectric transducer means linked by a single electrical channel to phase detector means, said monitor signal being representative of the amplitude of the compound light signal at the predetermined frequency and hence of said difference between the light signals in the first and second receptor means, whereby said monitor signal represents the characteristic of said light spot.

2. A method according to claim 1, said first and second light receptor means being respectively first and second pairs of light receptors, the receptors being equiangularly arranged about a central point and the receptors in each pair being angularly opposite each other so that said first and second pairs of light receptors define mutually perpendicular first and second axes, whereby the monitor signal is expressive of said light spot characteristic relative to said first and second axes.

3. A method according to claim 1, said first and second light receptor means being respectively first and second light receptors of a first pair of light receptors, there also being first and second light receptors of a second pair of light receptors, the receptors being equiangularly arranged about a central point and the receptors in each pair being angularly opposite each other so that said first and second pairs of receptors define mutually perpendicular first and second axes respectively, wherein the light signals in the second receptor of each pair of receptors are delayed relative to the light signals in the first receptor of each pair of receptors by a predetermined fraction of a wavelength of the predetermined frequency, the delay of the light signals in the first receptor of the second pair of receptors being substantially greater than the delay of the light signals in the second receptor of the first pair of receptors, the outputs of the receptors being combined to produce a compound light signal having, at the predetermined frequency, a first amplitude dependant upon the magnitude of the difference in amplitudes between the light signals in the first pair of receptors, and a second amplitude dependant upon the magnitude of the difference in amplitudes between the light signals in the second pair of receptors, first and second monitor signals being derived from the compound light signal, the first monitor signal being representative of the first amplitude of the compound light signal and hence of said difference between the light signals in the first pair of receptors, the second monitor signal being representative of the second amplitude of the compound light signal and hence of said difference between the light signals in the second pair of receptors, whereby said first and second monitor signals are expressive of said light spot characteristic relative to said first and second axes respectively.

4. A method according to claim 1 or claim 2 in which the light signals in the second receptor means are delayed relative to the light signals in the first receptor means by one half of a cycle of the predetermined frequency.

5. A method according to claim 3 in which the light signals in each of the second receptors are delayed relative the light signals in each of the first receptors by one half of a cycle of the predetermined frequency, the light signals in the first receptor of the second pair of receptors being delayed relative to the light signals in the first receptor of the first pair of receptors by one quarter of a cycle of the predetermined frequency.

6. A method according to claim 1 comprising the additional steps of:

(a) deriving from the compound light signal an additional signal representative of the total light flux falling on the light receptor means; and (b) normalising the or each monitor signal by obtaining its ratio with the addition signal.

7. Apparatus for monitoring a geometrical or positional characteristic of a light spot, comprising at least first and second light receptor means arranged in fixed relationship to each other and optical means for imaging incident light as said light spot onto said receptor means thereby producing in each receptor means light signals whose magnitude is dependent upon said light spot characteristic, the apparatus further comprising:

(a) means for modulating the incident light at a predetermined frequency to give the incident light a duty cycle of substantially 50%;

(b) means for delaying the light signals in the second receptor means relative to the light signals in the first receptor means by a predetermined fraction of a cycle of the predetermined frequency;

(c) means for combining the outputs of the first and second receptor means to produce a compound light signal having an amplitude at the predetermined frequency which is dependent upon the magnitude of the difference in amplitudes between the light signals in the first and second receptor means; and (d) means for deriving an electrical monitor signal from the compound light signal from the compound light signal using photoelectric transducer means linked by a single electrical channel to phase detector means, said monitor signal being representative of the amplitude of the compound light signal at the predetermined frequency and hence of said difference between the light signals in the first and second receptor means, whereby the monitor signal represents the characteristic of said light spot.

8. Apparatus according to claim 7 in which the first and second light receptor means comprise respectively first and second pairs of light receptors, the receptors being equiangularly arranged about a central point and the receptors in each pair being angularly opposite each other so that said first and second pairs of light receptors define mutually perpendicular first and second axes, whereby the monitor signal is expressive of said light spot characteristic relative to said first and second axes.

9. Apparatus according to claim 7 in which the first and second light receptor means comprise respectively first and second light receptors of a first pair of light receptors, the apparatus further comprising first and second light receptors of a second pair of light receptors, the light receptors being equiangularly arranged around a central point and the light receptors in each pair being angularly opposite each other so that said first and second pairs of receptors define mutually perpendicular first and second axes respectively, means for delaying the light signals in the second receptor of each pair of receptors relative to the light signals in the first receptor of each pair of receptors by a predetermined fraction of a cycle of the predetermined frequency, said means for delaying the light signals being adapted to delay the light signals in the first receptor of the second pair of receptors by a substantially greater amount than the light signals in the second receptor of the first pair of receptors, means for combining the outputs of the receptors to produce a compound light signal having the predetermined frequency a first amplitude dependant upon the magnitude of the difference in amplitudes between the light signals in the first pair of receptors, and a second amplitude dependant upon the magnitude of the difference in amplitudes between the light signals in the second pair of receptors, means for deriving from the compound light signal a first monitor signal representative of said first amplitude of the compound light signal and hence of said difference between the light signals in the first pair of receptors and a second monitor signal representative of said second amplitude of the compound light signal and hence of said difference between the light signals in the second pair of receptors, whereby said first and second monitor signals are expressive of said light spot characteristic relative to said first and second axes respectively.

10. Apparatus according to claim 7 or claim 8 in which the means for delaying the light signals is adapted to delay the light signals in the second receptor relative to the light signals in the first receptor means by one half of a cycle of the predetermined frequency.

11. Apparatus according to claim 9 in which the means for delaying the light signals is adapted to delay the light signals in each of the second receptor by one half of a cycle of the predetermined frequency relative to the light signals in each of the first receptors, and is also adapted to delay the light signals in the first receptor of the second pair of receptors by one quarter of a cycle of the predetermined frequency relative to the light signals in the first receptor of the first pair of receptors.

12. Apparatus according to claim 7, additionally comprising:
  (a) means for deriving from the compound light signal an addition signal representative of the total light flux falling on the receptors; and
  (b) dividing means for normalising the or each monitor signal by dividing it by the addition signal.

13. A method of monitoring a relative displacement between first and second objects, in which an optical system mounted on the first object images a light source on the second object onto at least first and second light receptor means on the first object, thereby forming a light spot having a geometrical or positional characteristic which is dependent upon said relative displacement, said characteristic being monitored by a method comprising:
  (a) modulating the incident light at a predetermined frequency to give the incident light a duty cycle of substantially 50%;
  (b) delaying the light signals in the second receptor means relative to the light signals in the first receptor means by a predetermined fraction of a cycle of the predetermined frequency;
  (c) combining the outputs of the first and second receptor means to produce a compound light signal having an amplitude at the predetermined frequency which is dependent upon the magnitude of the difference in amplitudes between the light signals in the first and second receptor means; and
  (d) deriving an electrical monitor signal from the compound light signal using photoelectric transducer means linked by a single electrical channel to phase detector means, said monitor signal being representative of the amplitude of the compound light signal at the predetermined frequency and hence of said difference between the light signals in the first and second receptor means, whereby said monitor signal represents the characteristic of said light spot thereby to derive a signal representative of said relative displacement.

14. A method according to claim 13 comprising projecting light from a primary light source on the first object onto the second object to produce the light source thereon.

15. A method according to claim 14 in which the primary light source is conjoint with the optical system on the first object, the primary light source being imaged through the optical system onto the second object to produce am image of the primary light source thereon, the image of the light source on the second object being reimaged back through the optical system onto the light receptor means.

16. Apparatus for monitoring a relative displacement between/first and second objects, comprising an optical system and at least first and second light receptor means mounted on the first object, the optical system being arranged to image a light source on the second object onto the light receptor means as a light spot having a geometrical or positional characteristic which is dependent upon said relative displacement, the apparatus further comprising:
  (a) means for modulating the incident light at a predetermined frequency to give the incident light a duty cycle of substantially 50%;
  (b) means for delaying the light signals in the second receptor means relative to the light signals in the first receptor means by a predetermined fraction of a cycle of the predetermined frequency;
  (c) means for combining the outputs of the first and second receptor means to produce a compound light signal having an amplitude at the predetermined frequency which is dependent upon the magnitude of the difference in amplitudes between the light signals in the first and second receptor means; and
  (d) means for deriving an electrical monitor signal from the compound light signal using photoelectric transduced means linked by a single electrical channel to phase detector means, said monitor signal being representative of the amplitude of the compound light signal at the predetermined frequency and hence of said difference between the light signals in the first and second receptor means, whereby the monitor signal represents the characteristic of said light spot for monitoring said characteristic thereby to derive a signal representative of said relative displacement.

17. Apparatus according to claim 16 comprising a primary light source on the first object and means for projecting light from the primary light source onto the second object to produce the light source thereon.

18. Apparatus according to claim 17 in which the primary light source is arranged conjointly with the optical system on the first object, the arrangement being such that the optical system images the primary light source onto the second object, and reimages the resultant image of the primary light source onto the light receptor means.

19. Apparatus according to claim 7, in which the light receptor means comprise fibre-optic light transmission means appropriately provided with optical dely lines for delaying the light signals as required.

20. Apparatus according to claim 19 comprising fibre-optic connector means connected to the fibre-optic light transmission means for combining light signals inputted therefrom and outputting the compound light signal.

21. Apparatus according to claim 7, comprising a photoelectric transducer element connected to receive the compound light signal thereby to produce an equivalent compound electrical signal, and electronic signal processing means comprising a phase-sensitive detector or the like for deriving the monitor signal from the compound electrical signal.

22. Apparatus according to claim 12 in which the means for deriving an addition signal from the compound light signal comprises a photoelectric transducer element connected to receive the compound light signal thereby to produce an equivalent compound electrical signal, and a band-pass filter adapted to derive the addition signal from the compound electrical signal.

23. Apparatus according to claim 16, in which the light receptor means comprise fibre-optic light transmission means appropriately provided with optical delay lines for delaying the light signals as required.

24. Apparatus according to claim 16, comprising a photoelectric transducer element connected to receive the compound light signal thereby to produce an equivalent compound electrical signal, and electronic signal processing means comprising a phase-sensitive detector for deriving the monitor signal from the compound electrical signal.

25. Apparatus according to claim 20, comprising a photoelectric transducer element connected to receive the compound light signal thereby to produce an equivalent compound electrical signal, and electronic signal processing means comprising a phase-sensitive detector for deriving the monitor signal from the compound electrical signal.

* * * * *

UNITED STATES PATENT AND TRADEMARK OFFICE
CERTIFICATE OF CORRECTION

PATENT NO. : 4,765,742

DATED : August 23, 1988

INVENTOR(S) : Ian Davinson

It is certified that error appears in the above-identified patent and that said Letters Patent is hereby corrected as shown below:

```
Column 5, line 4, "coupling" should read -- cooling --.
          line 29, "x'" should read -- X' --.
          line 68, "ration" should read -- ratio --.
Column 6, line 33, "105 module" should read -- module 105 --.
          line 46, "(A-B)-" should read -- (A-B)   --.
Column 10, line 21, "It" should read -- If --.
Column 14, lines 36 and 37, delete "from the compound light signal".
Column 15, line 7, after "having", insert -- at --.
           line 26, after "receptor" insert -- means --.
Column 16, line 20, "am" should read -- an --.
           line 26, delete "/" after "between".
           line 50, "transduced" should read -- transducer --.
```

Signed and Sealed this

Twenty-eighth Day of February, 1989

Attest:

DONALD J. QUIGG

*Attesting Officer*     Commissioner of Patents and Trademarks